(12) United States Patent
Harlander et al.

(10) Patent No.: US 7,773,229 B2
(45) Date of Patent: Aug. 10, 2010

(54) DOPPLER ASYMMETRIC SPATIAL HETERODYNE SPECTROSCOPY

(75) Inventors: John M Harlander, St. Cloud, MN (US); Christoph R Englert, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 266 days.

(21) Appl. No.: 12/179,720

(22) Filed: Jul. 25, 2008

(65) Prior Publication Data

US 2009/0051899 A1   Feb. 26, 2009

Related U.S. Application Data

(60) Provisional application No. 60/952,121, filed on Jul. 26, 2007, provisional application No. 61/080,069, filed on Jul. 11, 2008.

(51) Int. Cl.
*G01B 9/02* (2006.01)
(52) U.S. Cl. ..................................................... 356/451
(58) Field of Classification Search ................. 356/451, 356/456, 521
See application file for complete search history.

(56) References Cited

U.S. PATENT DOCUMENTS

| | | | | |
|---|---|---|---|---|
| 5,059,027 | A * | 10/1991 | Roesler et al. | 356/456 |
| 7,330,267 | B1 * | 2/2008 | Weitzel | 356/456 |
| 7,433,044 | B1 * | 10/2008 | Szarmes et al. | 356/451 |
| 7,466,421 | B2 * | 12/2008 | Weitzel | 356/451 |
| 2009/0231592 | A1 * | 9/2009 | Harlander et al. | 356/456 |

* cited by examiner

*Primary Examiner*—Hwa S. A Lee
(74) *Attorney, Agent, or Firm*—Amy L. Ressing; L. George Legg

(57) ABSTRACT

A Doppler Asymmetric Spatial Heterodyne (DASH) spectrometer includes an input aperture for receiving an input light; a collimating lens for collimating the input light into a collimated light; offset establishing means, including at least one grating, for i) receiving and splitting the collimated light into a first light wavefront in a first optical path and into a second light wavefront in a second optical path, ii) establishing an offset in a light wavefront path distance between the first and second optical path light wavefronts, and iii) diffracting and recombining the first and second optical path light wavefronts into an interference wavefront to form an interference image that includes a plurality of phase points of a heterodyned interferogram measured simultaneously over the path distance offset; and an output optics section comprising a detector for receiving the interference image and outputting an interference image pattern.

23 Claims, 13 Drawing Sheets

DOPPLER ASYMMETRIC SPATIAL HETERODYNE SPECTROSCOPY

CROSS-REFERENCE TO RELATED APPLICATIONS

This Application is a Non-Prov of Prov (35 USC 119(e)) application 60/952,121 filed on Jul. 26, 2007, and application 61/080,069 filed on Jul. 11, 2008, both incorporated herein by reference.

BACKGROUND OF THE INVENTION

Atmospheric wind observations with passive optical remote sensing techniques that measure Doppler shift have a long heritage. To date, space based optical measurements of winds in the Earth's atmosphere have been performed using either Fabry-Perot interferometers or Michelson interferometers. Both instrument types use a limb viewing geometry to detect the Doppler shift of discrete atmospheric emission lines caused by the bulk velocity along the line of sight at the tangent layer. The horizontal wind vector is determined by combining two measurements of the same air mass with orthogonal look direction, typically taken several minutes apart, 45° and 135° from the velocity vector of the satellite.

Fabry-Perot Heritage

As discussed in Hayes P. B. et al., "The High-Resolution Doppler Imager on the Upper Atmosphere Research Satellite", *J. Geophys. Res.*, 98, 10713-10723, 1993, and Killeen T. L. et al., "TIMED Doppler Interferometer (TIDI), *Proc. SPIE*, 3756, 289-315, 1999, the High-Resolution Doppler Imager (HRDI) on NASA's Upper Atmospheric Research Satellite (UARS) and TIDI on NASA's Thermosphere Ionosphere Mesosphere Energetics and Dynamics (TIMED) mission utilize a triple and a single Fabry-Perot interferometer, respectively, to measure emissions between 550-900 nm. The Fabry-Perot instruments utilize one or multiple etalons in series to isolate and spectrally resolve the emission line(s) of interest. The spectrum over a narrow wavelength range is obtained directly by imaging the ring pattern produced by the interferometer on a position sensitive detector. Once the spectrum is obtained, the wind speed can be derived from the line position. The temperature can be determined from either the line width or a line ratio. The biggest technical challenge for the Fabry-Perots lies in achieving the required etalon alignment tolerances (better than ~λ/20) and maintaining this alignment during flight. Although many resolution elements are measured in parallel, the solid angle Ω for a single resolution element is determined by the resolving power R (i.e. $\Omega=2\pi/R$) which can be small at the resolution required for Doppler measurements. Since the high resolving power necessitates a small solid angle, a large interferometer aperture may be required to obtain adequate signal on faint emissions. This results in a larger, heavier instrument.

Stepped Michelson Heritage

As discussed in Shepherd et al., "WINDII, the Wind Imaging Interferometer on the Upper Atmosphere Research Satellite", J. Geophys. Res., 98, 10725-10750, 1993 ("Shepherd et al."), the Wind Imaging Interferometer (WINDII) on UARS uses an all-glass, field widened, chromatically, and thermally compensated, phase-stepped Michelson interferometer (also termed Stepped Fourier Transform Spectrometer or stepped FTS). Several other versions of phase-stepped interferometers have been built or proposed for the measurement of telluric winds (see Babcock et al., "A Prototype Near-IR Mesospheric Imaging Michelson Interferometer (MIMI) for Atmospheric Wind Measurement," Eos Trans. AGU, 85(47), Fall Meet. Suppl., Abstract SA41A-1040, 2004, and Ward et al., "The Waves Michelson Interferometer: A visible/near IR interferometer for observing middle atmosphere dynamics and constituents," Proc. SPIE Int. Soc. Opt. Eng., 4540, 100, 2001. ("Ward et al. 1")) and winds on Mars (see Ward, W. E. et al., "An imaging interferometer for satellite observation of wind and temperature on Mars, the Dynamics Atmosphere Mars Observer (DYNAMO)," Proc. SPIE Int. Soc. Opt. Eng., 4833, 226, 2002 ("Ward et al. 2")).

The basic principle behind all phase stepped Michelson interferometers is to measure a minimum of three, but typically four, interferogram points of a single isolated atmospheric emission line. The phase points are spaced by ~λ/4 (90°) about a step (or offset) in optical path difference (OPD) that is large enough to be sufficiently sensitive to both wind speed, which results in a phase shift at high OPD, and temperature, which results in a variation in modulation depth. This principle is illustrated in FIG. 1. It shows a schematic interferogram as it would be recorded by a conventional scanning Michelson interferometer viewing an isolated, single Gaussian (temperature broadened) emission line. Zero path difference is at the center of the plot with maximum path difference at the edges. The carrier frequency of the fringe pattern is determined by the central wavenumber of the emission which is Doppler shifted by the wind speed. For a predominantly temperature broadened line, the width of the interferogram envelope is a measure of the temperature, with a higher temperature corresponding to a narrower envelope. The thick line in FIG. 1 illustrates the residual obtained by taking the difference between two interferograms each corresponding to a different wind speed, which causes them to have slightly different carrier frequencies. The thin curve shows the intensity vs. optical path difference for a Gaussian emission line as it would be recorded by a scanning Michelson interferometer scanned over the entire modulated path difference. Zero path difference is at the center of the plot where the visibility of the fringes is maximal. The maximum response of the measurement to wind speed is at path difference $P_{OPT}$ where the amplitude of the signal difference is maximal. Assuming a temperature broadened, Gaussian line profile with width $\sigma_D$:

$$\sigma_D = \sigma_0 \sqrt{\frac{kT}{mc^2}} \qquad (1)$$

the optimum path difference is:

$$P_{OPT} = \frac{1}{2\pi\sigma_D} \qquad (2)$$

where $\sigma_0$ is the wavenumber of the line center, k is Boltzmann's constant, m is the molecular or atomic mass of the emission source, T is the temperature, and c is the speed of light.

Note that the fringe frequency in FIG. 1 has been greatly reduced for illustrative purposes. A real interferogram taken with a Michelson interferometer for a near infrared (NIR) emission line would produce ~$10^5$ fringes between path differences 0 and $P_{OPT}$ under typical atmospheric conditions.

Determining Doppler shifts with a phase-stepped Michelson requires the isolation of a single emission line with a pre-filter. A fit of the interferogram phase at the four measured samples is then possible, which can subsequently be used to determine the Doppler frequency shift. If the line is close to other emissions in the spectrum, the pre-filter has to be extremely narrow, which can be achieved by an additional Fabry-Perot etalon prefilter, with all of its attendant difficulties and the resulting reduction in throughput (see Ward, W. E. et al., "The Waves Michelson Interferometer: A visible/near IR interferometer for observing middle atmosphere dynamics and constituents," Proc. SPIE Int. Soc. Opt. Eng., 4540, 100, 2001, and Ward, W. E. et al., "An imaging interferometer for satellite observation of wind and temperature on Mars, the Dynamics Atmosphere Mars Observer (DYNAMO)," Proc. SPIE Int. Soc. Opt. Eng., 4833, 226, 2002). Using an a priori line shape assumption (e.g. Gaussian or Voigt), the line width can be determined from the interferogram modulation, which yields the temperature for a predominantly temperature broadened line.

Several stepped FTS techniques have been used to measure Doppler shifts. The WINDII instrument uses piezoelectric actuators to move one mirror of the interferometer (Shepherd et al.). The MIMI (Mesospheric Imaging Michelson Interferometer) instrument uses a segmented mirror with four sections at different OPD, which avoids moving the mirror (Babcock et al.). The WAMI (Waves Michelson Interferometer) version, designed for the Earth's atmosphere, proposes a moving, segmented mirror, allowing the simultaneous measurement of two emission lines with a two step mirror scan (Ward et al. 1). A phase-stepped Michelson interferometer has also been proposed for Mars using a non-segmented, mirror moved by piezo actuators.

Disadvantages of FTS as discussed above include the need for moving parts (in case of a dynamically stepped system) and the reduced throughput due to the necessary pre-filter leading to an increase in the size and weight of the overall payload.

Spatial Heterodyne Spectroscopy Heritage

Spatial Heterodyne Spectroscopy (SHS) was conceived in the late 1980s and was mainly facilitated by the availability of array detectors (see Harlander J. M., R. J. Reynolds, and F. L. Roesler, "Spatial heterodyne spectroscopy for the exploration of diffuse interstellar emission lines at far ultraviolet wavelengths," Astrophys. J., 396, 730-740, 1992, and Harlander J. M. et al., "Field-Widened Spatial Heterodyne Spectroscopy: Correcting for Optical Defects and New Vacuum Ultraviolet Performance Tests," Proc. SPIE Int. Soc. Opt. Eng., 2280, 310, 1994). The basic principle of SHS is that the path difference that is typically scanned by a Michelson interferometer is imaged onto a position-sensitive detector without moving parts. This is accomplished by replacing the return mirrors in a Michelson interferometer with Littrow diffraction gratings and imaging the gratings onto the detector. SHS instruments measure all interferogram samples simultaneously in the spatial domain using a line or array detector. They heterodyne the spatial fringe frequency around the Littrow wavenumber, $\sigma_L$, of the gratings, which allows the optimum use of the number of array detector elements. As a result, SHS allows the design of compact, high throughput, high resolution spectrometers without moving parts. To date, SHS has mainly been used in the UV and visible. The first orbital flight of an SHS was performed in 2002 with the proof of concept mission of SHIMMER (Spatial Heterodyne Imager for Mesospheric Radicals) on the Space Shuttle (see Harlander J. M., F. L. Roesler, J. G. Cardon, C. R. Englert, and R. R. Conway, "SHIMMER: A Spatial Heterodyne Spectrometer for Remote Sensing of Earth's Middle Atmosphere," Appl. Opt., 41, 1343-1352, 2002, Cardon J. G., C. R. Englert, J. M. Harlander, F. L. Roesler M. H. Stevens, "SHIMMER on STS-112: Development and Proof-of-Concept Flight, AIAA Space 2003 Conference & Exposition," AIAA Paper 2003-6224, 2003, and Englert C. R., J. M. Harlander, J. G. Cardon, and F. L. Roesler, "Correction of phase distortion in spatial heterodyne spectroscopy," Appl. Opt., 43, 6680-6687, 2004). An improved version of SHIMMER including a monolithic interferometer was placed in low-earth orbit on STPSat-1 in early 2007 (see Harlander J. M., F. L. Roesler, C. R. Englert, J. G. Cardon, R. R. Conway, C. M. Brown, J. Wimperis, "Robust monolithic ultraviolet interferometer for the SHIMMER instrument on STPSat-1," Applied Optics, 42, 2829-2834, 2003).

A disadvantage of conventional SHS is its limited resolving power, which is typically not high enough to measure the Doppler shift caused by winds.

It would therefore be desirable to provide a system for wind measurements that is more robust and lighter in weight that present systems.

BRIEF SUMMARY OF THE INVENTION

According to the invention, a Doppler Asymmetric Spatial Heterodyne (DASH) spectrometer includes an input aperture for receiving an input light; a collimating lens for collimating the input light into a collimated light; offset establishing means, including at least one grating, for i) receiving and splitting the collimated light into a first light wavefront in a first optical path and into a second light wavefront in a second optical path ii) establishing an offset in a light wavefront path distance between the first and second optical path light wavefronts, and iii) diffracting and recombining the first and second optical path light wavefronts into an interference wavefront to form an interference image that includes a plurality of phase points of a heterodyned interferogram measured simultaneously over the path distance offset; and an output optics section comprising a detector for receiving the interference image and outputting an interference image pattern.

In one embodiment, the offset establishing means is a Kösters prism, a single grating; and a field-widening prism positioned between the Kösters prism and the single grating.

In another embodiment, the offset establishing means is a beamsplitter, a first grating positioned in the first optical path for reflecting the first collimated light portion back to the beamsplitter as the first optical path light wavefront, and a second grating positioned in the second optical path for reflecting the second collimated light portion back to the beamsplitter as the second optical path light wavefront. The second grating is positioned at a greater distance than the first grating with respect to the beamsplitter to produce the offset in the light wavefront path distance between the first and second optical path wavefronts.

DASH is typically lighter and more robust than competing designs. DASH does not require any moving optical components and can be built in a compact, robust way, which makes it suitable for space flight. DASH includes the advantages of SHS, robustness, small size, and sensitivity, while extending its capability to a resolving power high enough to measure the Doppler shift caused by winds.

Like stepped FTS, DASH can be field widened and has large interferometric throughput, exhibiting good etendue. In addition, DASH can accept multiple emission lines in the passband, eliminating the use of ultra narrow filters and their concomitant reduction in throughput and temperature sensitivity. The multi-line capability allows the simultaneous tracking of the "zero wind phase" by superimposing a known emission line onto the atmospheric scene, enabling the tracking of thermal instrument drifts.

DASH records several hundred interferogram points within an optical path difference interval centered on a path offset, producing increased immunity to ghost fringes and background features which are more difficult to identify if only four phase points are available.

Atmospheric temperature information can be retrieved in addition to the wind field information using the temperature dependence of line strength ratios as well as the interferogram contrast which includes information about the line shape.

DETAILED DESCRIPTION OF THE INVENTION

Definitions

As used herein, the term "field-widening prism" means a wedged, refractive element whose purpose is to increase the throughput of the system by reducing the path difference change between on and off-axis rays. Exemplary field-widening prisms include prisms typically manufactured from low-dispersion glass.

Figure 1:
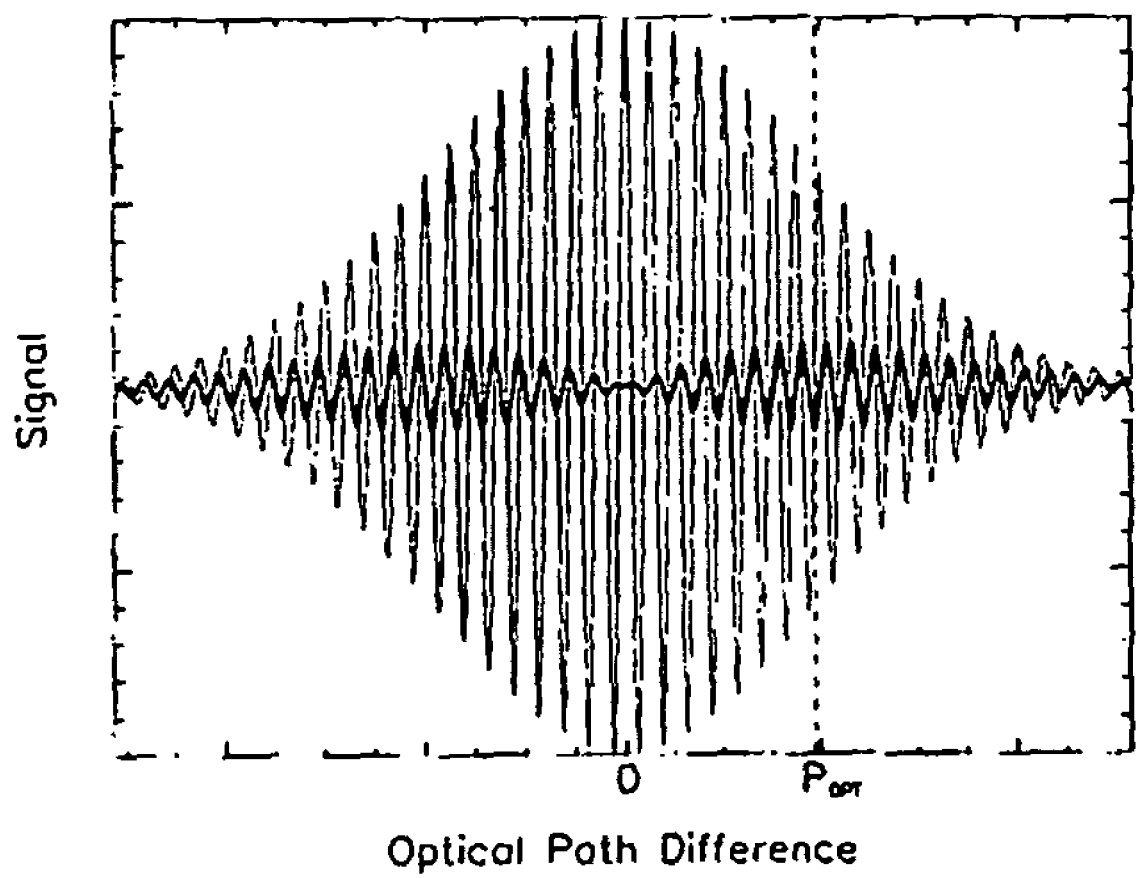
FIG. 1 is a schematic interferogram recorded by a conventional scanning Michelson interferometer viewing an isolated, single Gaussian (temperature broadened) emission line and the residual obtained by taking the difference between two interferograms each corresponding to a different wind speed.
Figure 2:
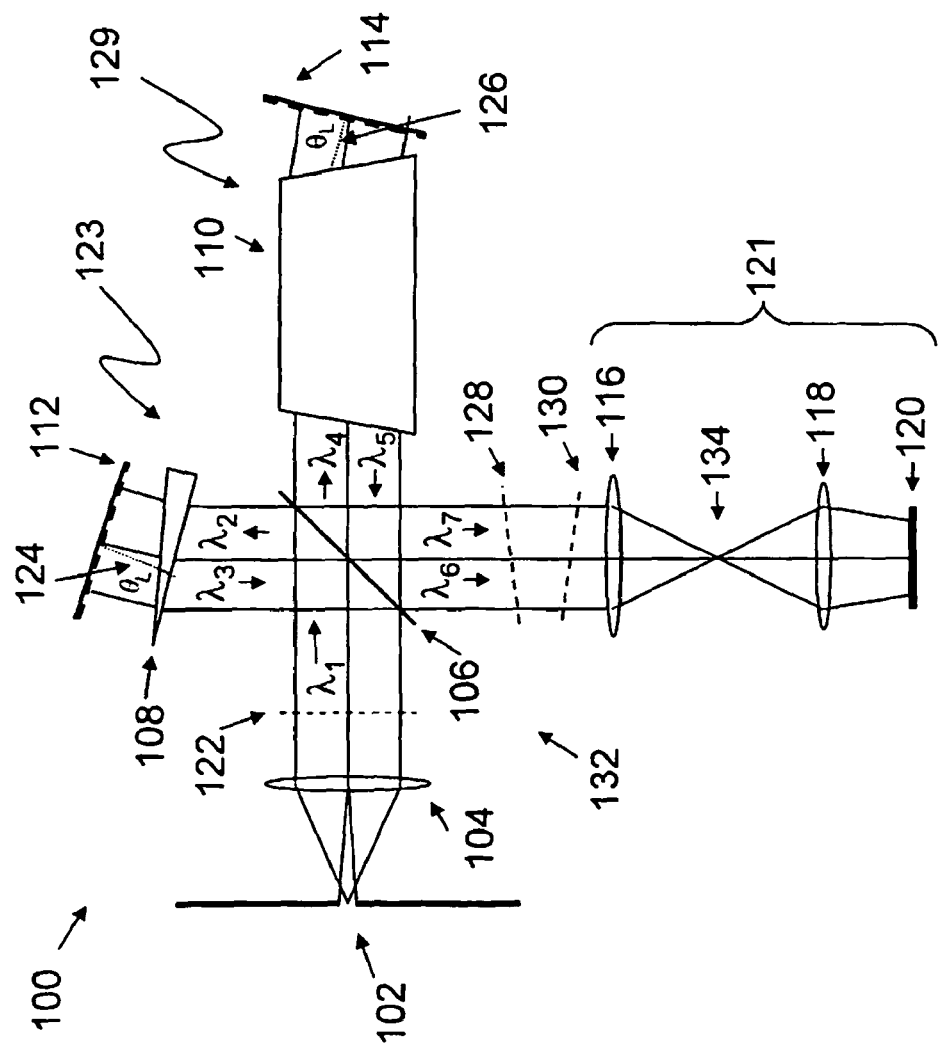
FIG. 2 is a schematic diagram of a DASH system according to the invention.

Referring now to FIG. 2, a Doppler Asymmetric Spatial Heterodyne (DASH) spectrometer 100 includes input optics, an interferometer and output optics. The input optics include an input aperture 102, and collimating lens 104. The interferometer includes a beam splitter 106, optional prisms 108 and 110, grating 112, and grating 114. The output optics section 121 includes focusing lens 116, collimating lens 118 and detector array 120.

In operation, input light passes through input aperture 102 and diverges to collimating lens 104. Collimated light $\lambda_1$, includes an incident wave front 122. Collimated light $\lambda_1$, is then incident upon beam splitter 106. Beamsplitter 106 splits the collimated light $\lambda_1$ into a light $\lambda_2$ in a first optical path (also termed a "first arm") 123 of spectrometer 100 and into a light $\lambda_4$ in a second optical path (also termed a "second arm") 129. The light $\lambda_2$ in the first optical path 123 then traverses (optional) prism 108 that refracts it at an angle toward grating 112. Grating 112 is tilted by the Littrow angle $\theta_L$ (124) and reflects light $\lambda_3$ back through prism 108 and toward beam splitter 106, where light $\lambda_3$ is partially reflected toward lens 104 and partially transmitted toward lens 116. The output optics section 121 is designed to image the grating planes 112 and 114 onto the detector array 120. Here, the partially transmitted light $\lambda_6$ includes a wave front 130 and is focused by lens 116 to a point 134. The light $\lambda_6$ then diverges toward lens 118 to be imaged on detector array 120. The light $\lambda_4$ in the second optical path 129 traverses (optional) prism 110, which refracts it at an angle toward grating 114. Grating 114 is tilted by the Littrow angle $\theta_L$ (126) and reflects light $\lambda_5$ back through prism 110 and toward beam splitter 106, where light $\lambda_5$ is partially transmitted toward lens 104 and partially reflected toward lens 116. In the output optics section 121, the partially reflected light $\lambda_7$ includes a wave front 128 and is focused by lens 116 to a point 134. The light $\lambda_7$ then diverges toward lens 118 to be imaged on detector array 120 which records fringes of wavenumber-dependent spatial frequencies. Examples of suitable, currently available detector arrays are, depending on the wavelength region, one dimensional or two dimensional arrays of the following types: Charge-Coupled Devises (CCD) in the ultra violet, visible, and near infrared, Indium-Gallium-Arsenide (InGaAs)_arrays for the near infrared, Indium Antimonide (InSb) arrays for the near and mid infrared, or Mercury Cadmium Telluride (MCT) arrays for the near, mid and long wave infrared. The arrays typically have hundreds of elements (pixels) in at least one spatial dimension.

Figure 3:
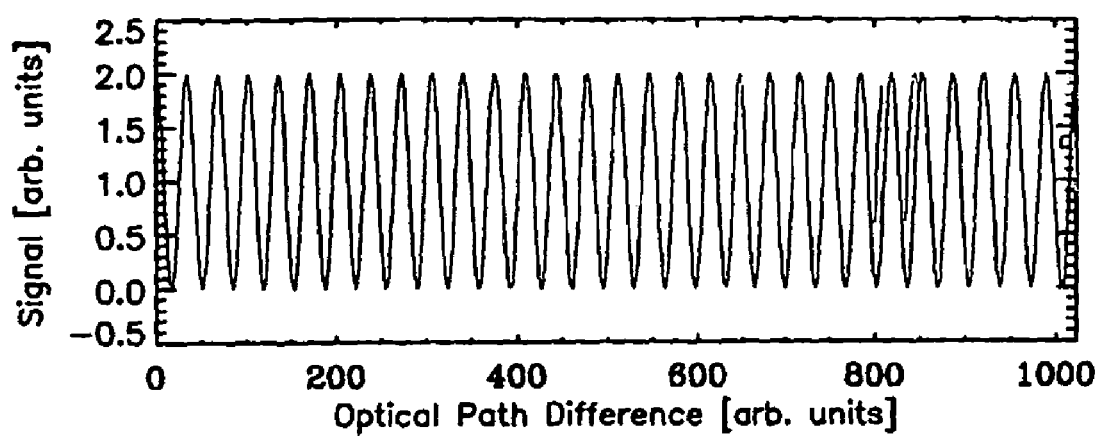
FIG. 3 is an interference pattern for a monochromatic source imaged according to the invention.

Wave front 128 constructively and destructively interferes with wave front 130, such that that image detected by detector array 120 is an interference pattern. An example of such an interference pattern for a monochromatic source is illustrated in FIG. 3. The characteristics of the pattern are based on the wavelength of the light $\lambda_1$ and the angle 132 between wave front 128 and wave front 130. Angle 132 is mainly based on the frequency of the input light $\lambda_1$ and the structure and angle of gratings 112 and 114. The asymmetrical configuration of the DASH invention is obtained where grating 114 is positioned further from the beamsplitter 106 than grating 112, resulting in a step or offset in path difference. The path difference interval is determined by the grating angle. The invention improves over SHS in that the range of sampled path differences is offset from zero path difference. SHS positions the centers of both gratings the same distance from the beamsplitter, producing a two-sided, heterodyned interferogram with zero path difference at the center, and maximum path difference at the edges of the recorded image. DASH positions one of the gratings further from the beamsplitter than the other, in what is then an "asymmetric" interferometer configuration. The fringe pattern measured by DASH is a heterodyned interferogram obtained over a path difference interval (determined by the grating angle) centered on a large path difference offset or step (determined by the offset of one grating).

Typical atmospheric wind velocities cause atmospheric emission lines to be Doppler shifted by only a few parts in $10^8$. This small wavelength shift results in a small frequency change in the interferogram as recorded by an SHS, DASH, or FTS instrument. FIG. 3 shows an ideal interferogram of a single, infinitely narrow spectral line versus optical path difference and the interferogram of a slightly Doppler shifted line. As is well known, the small frequency change in the interferogram has a negligible effect for small optical path differences; however, at longer path differences it appears predominantly as a phase shift. The main objective of DASH is to measure this phase shift, thus it is sufficient to measure the interferogram at high optical path differences. Note that the brightness of the interferogram and the fringe contrast contain information about the density of the emitter and the line shape, just like in the stepped FTS case. In FIG. 3, the darker line is an interferogram of an infinitely narrow spectral line, and the lighter line as an interferogram of a slightly Doppler shifted, infinitely narrow spectral line. This shows that the high resolution information about the exact line position and therefore the Doppler shift of the line is contained at high optical path differences. At large optical path differences, the predominant effect is a phase shift between the two fringe patterns that have slightly different frequencies.

The phase shift, $\delta\phi$, of a single emission line as a function of the optical path difference, $2\Delta d$, can be written as:

$$\delta\phi = 4\pi\Delta d\sigma(v/c) \qquad (3)$$

where $\sigma$ is the non-Doppler shifted wavenumber of the emission line, $v$ is the Doppler velocity and $c$ is the speed of light.

Figure 4:
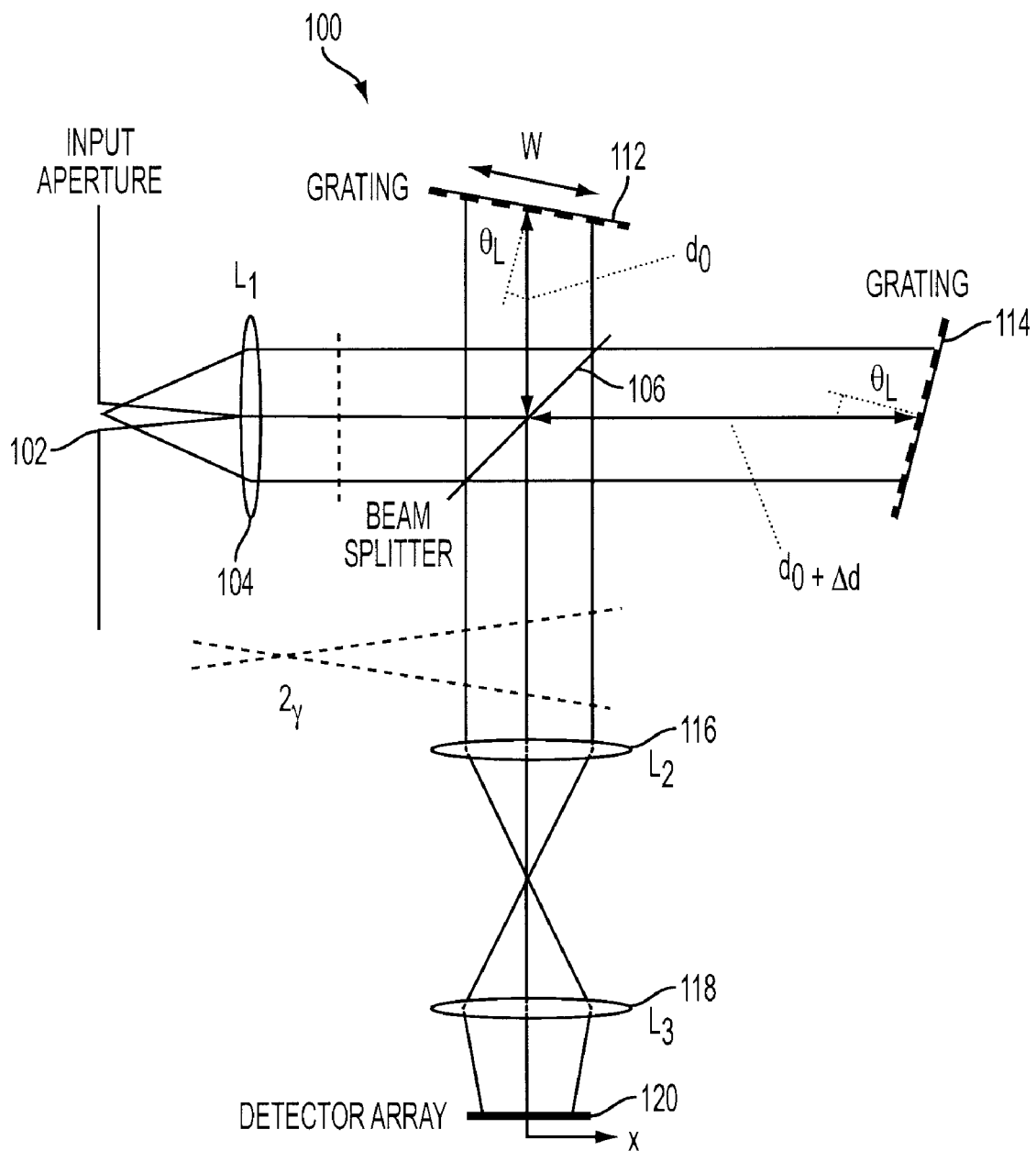
FIG. 4 is a schematic diagram of a non-field-widened DASH interferometer according to the invention.

Referring now to FIG. 4, DASH 100 allows the measurement of the interferogram within a path difference interval around the path difference offset $2\Delta d$. The difference between a conventional SHS interferometer and the DASH interferometer is the additional optical path difference offset ($2\Delta d$) in one of the interferometer arms, as shown. DASH can be explained assuming a plane wave front entering the interferometer shown as the vertical dashed line. The wave front is split at the beamsplitter 106 so that the two resulting beams illuminate the gratings 112 and 114 at the end of the interferometer arms. After being diffracted at the gratings 112 and 114, the wavefronts return to the beamsplitter 106 and recombine. At this point, the two wave fronts are each tilted by the angle $\gamma \approx 2\tan\theta_L[(\sigma-\sigma_L)/\sigma]$ with respect to the optical axis and one wave front is delayed by the optical path offset $2\Delta d$. Due to the wavelength dependent tilt of the wavefronts caused by the gratings, the detector array records a wavenumber dependent Fizeau fringe pattern, which is the Fourier transform of the incident spectral density heterodyned around the Littrow wavenumber $\sigma_L=1/(2g\sin\theta_L)$, where $1/g$ is the groove density of the gratings. The interferogram recorded by the DASH array detector can generally be written as:

$$I(x) = \frac{1}{2}\int_0^\infty B(\sigma)\left[1 + \cos\left\{2\pi[4(\sigma-\sigma_L)\tan\theta_L]\left[x + \frac{\Delta d}{2\tan\theta_L}\right]\right\}\right]d\sigma \qquad (4)$$

where $x$ is the location on the detector array 120 as indicated in FIG. 4 ($x=0$ is the center of the array), $\theta_L$ is the Littrow angle of the gratings, $B(\sigma)$ is the spectral density of the incident radiation and the magnification of the imaging optics ($L_2$ and $L_3$ in FIG. 4) is assumed to be unity. The sampled path difference interval, $d$, is:

$$2(\Delta d - W\sin\theta_L) < d < 2(\Delta d + W\sin\theta_L) \qquad (5)$$

where W is the beam width measured along each grating. The effective resolving power can be found using $R=\sigma(4W\sin\theta_L) \approx 2W/g$. The resolving power is equivalent to the number of illuminated grating grooves. This is the same result as for conventional SHS.

In contrast to the typical stepped Michelson interferometer, DASH allows the simultaneous measurement of several hundred interferogram samples within the path difference interval defined in Eq. (5). This means that DASH can simultaneously measure multiple lines, including calibration lines that can be used to track instrumental drifts.

Figure 5:
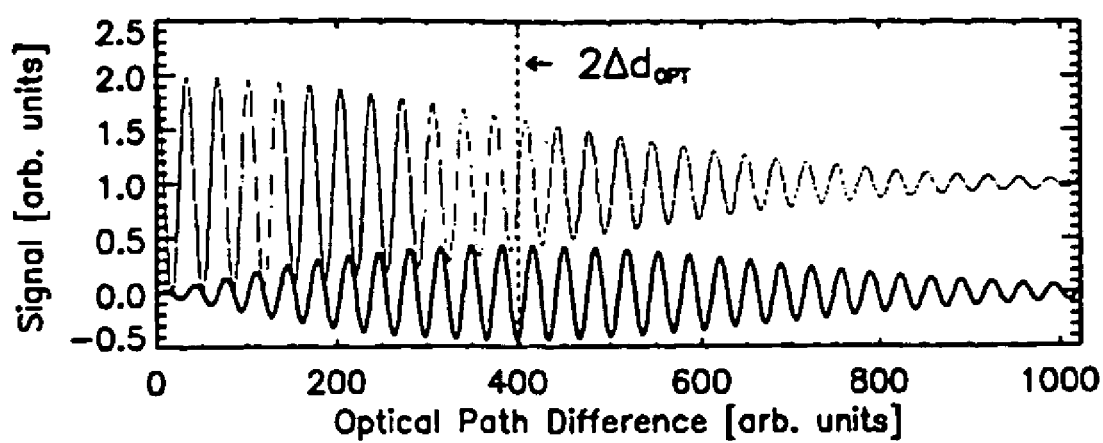
FIG. 5 shows two interferograms, one for a non-Doppler shifted line, one for a Doppler shifted line according to the invention. The lower trace shows the difference of the two interferograms on an enhanced scale.

Optimum Path Difference Offset:

Atmospheric emission lines are subject to line broadening effects such as pressure and temperature broadening. Line broadening affects the envelope of the interferogram; a broader line corresponds to an envelope that decreases more rapidly with increasing path difference. In general, this envelope function causes the interferogram contrast, or visibility, to decrease with increasing optical path difference as shown for a purely temperature broadened line in FIG. 5. This effect competes with the increasing phase shift for increasing optical path difference (see Eq. (3)) so that there is an optimum path difference offset for which measuring the phase shift and thus the Doppler shift is most sensitive. We find this optimum path difference by maximizing the envelope of the difference between the interferograms of a Doppler shifted and non-shifted line (see FIG. 5). Maximizing the envelope, rather than the actual interferogram differences is appropriate since the DASH concept allows the simultaneous observation of many fringes, as discussed below. In FIG. 5, in the upper part of the graph, the black line is the interferogram of a single, temperature broadened line, illustrating the decreasing contrast for increasing optical path difference is due to the finite line width of the emission line, while the lighter line is the interferogram of a slightly Doppler shifted emission line; in the lower part of the graph, the dark line is the difference between the two interferograms. The dotted vertical line indicates the optical path difference for which the envelope of the difference function is largest. Here, the measurement is most sensitive to the phase shift. For the example of a purely temperature broadened line, which has a Gaussian line shape proportional to $\exp[-(\sigma-\sigma_0)^2/2\sigma_D^2]$ and a width of:

$$\sigma_D = \sigma_0\sqrt{\frac{kT}{mc^2}}, \qquad (6)$$

the optimum path difference is:

$$2\Delta d_{OPT} = \frac{1}{2\pi\sigma_D} \qquad (7)$$

where T is the temperature, m is the mass of the emitter, $\sigma_0$ is the wavenumber of the line center and k is Boltzmann's constant. Although Eq. (7) predicts the optimum path difference about which to make a Doppler measurement, practical concerns such as the size and sensitivity of the instrument may require the instrument be build with a non-optimum, typically smaller, path difference.

Finally, we point out that the optimum path difference only depends on the emission line shape. This is the case even if more than one line is within the passband, as is discussed below.

Phase (Doppler Shift) Determination:

We can simplify the DASH interferogram from several emission lines by writing:

$$I_D(x) = \sum_j S_j[1 + E_j(x)\cos(2\pi\kappa_j x + \Phi_j + \delta\varphi_j)] \quad (8)$$

$$= \sum_j S_j\left(1 + \frac{1}{2}E_j(x)\{\exp[i(2\pi\kappa_j x + \Phi_j + \delta\varphi_j)] + \exp[-i(2\pi\kappa_j x + \Phi_j + \delta\varphi_j)]\}\right)$$

Where j indexes several lines in the passband, x is the location on the detector as shown in FIG. 4, $S_j$ are proportional to the line brightness, $E_j(x)$ are the envelope functions that depend on the individual line shape and the path difference offset, $\kappa_j \equiv 4(\sigma_j - \sigma_L)\tan\theta L$ are the heterodyned spatial fringe frequencies for each line center, $\sigma_j$, $\Phi_j \equiv 4\pi(\sigma_j - \sigma_L)\Delta d$ are additive phase terms, and $\delta\varphi_j$ are the phase shifts resulting from the Doppler shift of each line. Note that κ also changes with the Doppler shift of the line, but that effect is typically negligible for typical atmospheric wind speeds.

When the bandpass, Littrow wavenumber, and path difference interval are chosen appropriately (see below), the Fourier transform of Eq. (8) yields a complex spectrum with localized, well separated features around spatial frequencies $+\kappa_j$ and $-\kappa_j$. The next step is to isolate one of these features, e.g. j=0, by zeroing out all spectral elements (including the ones at $-\kappa_0$) except the ones within a local region around $+\kappa_0$. This step effectively eliminates all interferogram contributions (see Eq. (8)), except one of the exponential terms, so that after the inverse Fourier transform we get:

$$I_D^0(x) = \frac{1}{2}S_0 E_0(x)\exp[i(2\pi\kappa_0 x + \Phi_0 + \delta\varphi_0)] \quad (9)$$

$$= \frac{1}{2}S_0 E_0(x)[\cos(2\pi\kappa_0 x + \Phi_0 + \delta\varphi_0) + i\sin(2\pi\kappa_0 x + \Phi_0 + \delta\varphi_0)]$$

Using Eq. (9), the phase term can now be calculated from the ratio of its imaginary and the real part:

$$2\pi\kappa_0 x + \Phi_0 + \delta\varphi_0 = \arctan\left(\frac{\mathfrak{I}(I_D^0)}{\mathfrak{R}(I_D^0)}\right) \quad (10)$$

After subtraction of $2\pi\kappa_0 x + \Phi_0$, which is also called the zero wind phase, we get the phase shift $\delta\varphi_0$ caused by the Doppler shift for this particular line. The speed between the emitter and the spectrometer can now be calculated using the phase shift $\delta\varphi_0$ and Eq. (3). The above procedure can be applied for all lines in the passband (j=0, 1 . . . ) yielding an independent velocity measurement for each line.

Alternatively to the technique described above, the phase shift $\delta\varphi_0$ can also be obtained by fitting the fringe pattern with an analytical function including $\delta\varphi_0$ as a parameter to be optimized.

We point out that the subtraction of the zero wind phase is a very critical step, since the zero wind phase is likely to be sensitive to instrument drifts. One method to determine the zero wind phase is to simultaneously observe a known, non-Doppler shifted reference line. With DASH one can, for example, use an in-situ calibration lamp that has one or more spectral lines in the passband and superimpose its signal onto the observed scene with an additional beamsplitter. This way every exposure includes a simultaneous zero wind calibration (see below).

Choice of Passband, Littrow Wavenumber, and Resolving Power:

To optimize the sensitivity of the atmospheric wind measurement, the choice of the passband depends on many factors such as the targeted emission spectrum, radiative transfer considerations, and/or detector performance to name only a few. Here, we focus on the considerations that are generally important for a DASH instrument rather than specific to a particular application.

First, one or more emission lines must be identified. If more than one line is chosen, they need to be well separated, i.e. their spectral spacing should be at least several times their line width. Second, the Littrow wavenumber and resolving power are chosen, which will constrain the number of illuminated grating grooves, the groove density and the grating angle (see Section 3A) of the DASH interferometer. The choice should be made so that the observed emission lines correspond to well-separated spatial frequencies which can be easily isolated in the spectral domain as described in section "Phase (Doppler Shift) Determination" above. For example, assuming three emission lines at 6020 $cm^{-1}$, 6060 $cm^{-1}$, and 6085 $cm^{-1}$, a Littrow wavenumber of 6000 $cm^{-1}$, and a resolving power of 6000 results in fringe frequencies of roughly 20, 60, and 85 fringes across the detector. In order to avoid aliasing, the highest fringe frequency may not exceed the Nyquist frequency, that is the number of fringes across the detector width may not exceed the number of detector pixels divided by two. This example illustrates that the heterodyning aspect of DASH is essential for achieving well separated fringe frequencies that can easily be sampled by available detector arrays that typically have hundreds of pixels. Without heterodyning, the fringe frequencies would be proportional to the line positions in wavenumbers, so that in the above example, the fringe frequencies of the lines at 6060 $cm^{-1}$ and 6085 $cm^{-1}$ would differ by less than 0.5%. Choosing fringe frequencies that are well separated also ensures that the envelope of the beat pattern from two or more lines in the passband has a periodicity that is significantly smaller than the width of the detector. This way the interferogram sampled by the detector can never be confined to a region near a node or zero point of the beat pattern envelope, which would result in greatly reduced contrast for the entire interferogram. Rather the optimum path offset remains a function of the line shape only.

The passband is typically defined by an optical filter in the DASH instrument. It is very important to note that the DASH filter is not required to isolate a single line in the observed emission line spectrum like in the case of a stepped Michelson interferometer. This generally allows the usage of a broader filter, with significantly higher peak transmittance, less angular and thermal dependence of the transmittance, which results in higher etendue and therefore higher sensitivity of the instrument.

Noise Propagation:

In order to estimate the Doppler velocity sensitivity of a DASH instrument, one needs to estimate the precision of the phase retrieval (see Eq. (3)). Here, we specifically describe the noise propagation from the measured interferogram to the retrieved phase (see Eq. (10)).

We start with the random noise, $\epsilon_1$, of the dark and flat field corrected interferogram. For a photon shot noise limited detector array and perfect fringe contrast, one can estimate for example:

$$\varepsilon_I = \sqrt{\frac{I_{tot}}{N} + \varepsilon_r + \varepsilon_d} \quad (11)$$

where $I_{tot}$ is the total number of detected electrons in the interferogram, N is the number of interferogram samples (e.g. number of pixels in a row of the focal plane array), $\epsilon_r$, is the read noise component, and $\epsilon_d$ is the dark noise component. After Fourier transformation into the spectral domain, the random noise in the interferogram propagates to random noise in the real and imaginary part of the spectrum with a distribution width of:

$$\varepsilon_S = \frac{1}{\sqrt{N}} \varepsilon_I \quad (12)$$

After isolating the localized spectral feature of one emission line with a boxcar function that is n pixels wide, centered on the feature, and subsequent inverse Fourier transformation into the interferogram domain, the distribution width of the random noise in both the real and imaginary part of the isolated interferogram can be written as:

$$\varepsilon_I^{ISO} = \frac{\sqrt{n}}{\sqrt{N}} \varepsilon_I \quad (13)$$

It is important to point out that the line isolation with the boxcar function results in noise in the interferogram that is no longer uncorrelated from sample to sample. Only n samples remain uncorrelated, the others result from their interpolation.

Propagating the correlated noise of the isolated interferogram through Eq. (10), results in the magnitude of the correlated noise in the retrieved phase, $\epsilon_p^{ISO}$, in units of radians:

$$\varepsilon_P^{ISO} = \frac{\varepsilon_I}{A_i} \sqrt{\frac{2n}{N}} = \frac{\varepsilon_I}{I_i} \sqrt{2Nn} \quad (14)$$

where $A_i$ is the amplitude of the fringe for the isolated line i in the measured interferogram and $I_i$ is the total modulated signal detected in the interferogram for the isolated line i.

Other potential sources of error include systematic and random uncertainties from the zero wind phase subtraction or pointing errors of a satellite platform, which can result in the improper correction for the satellite velocity.

Figure 6:
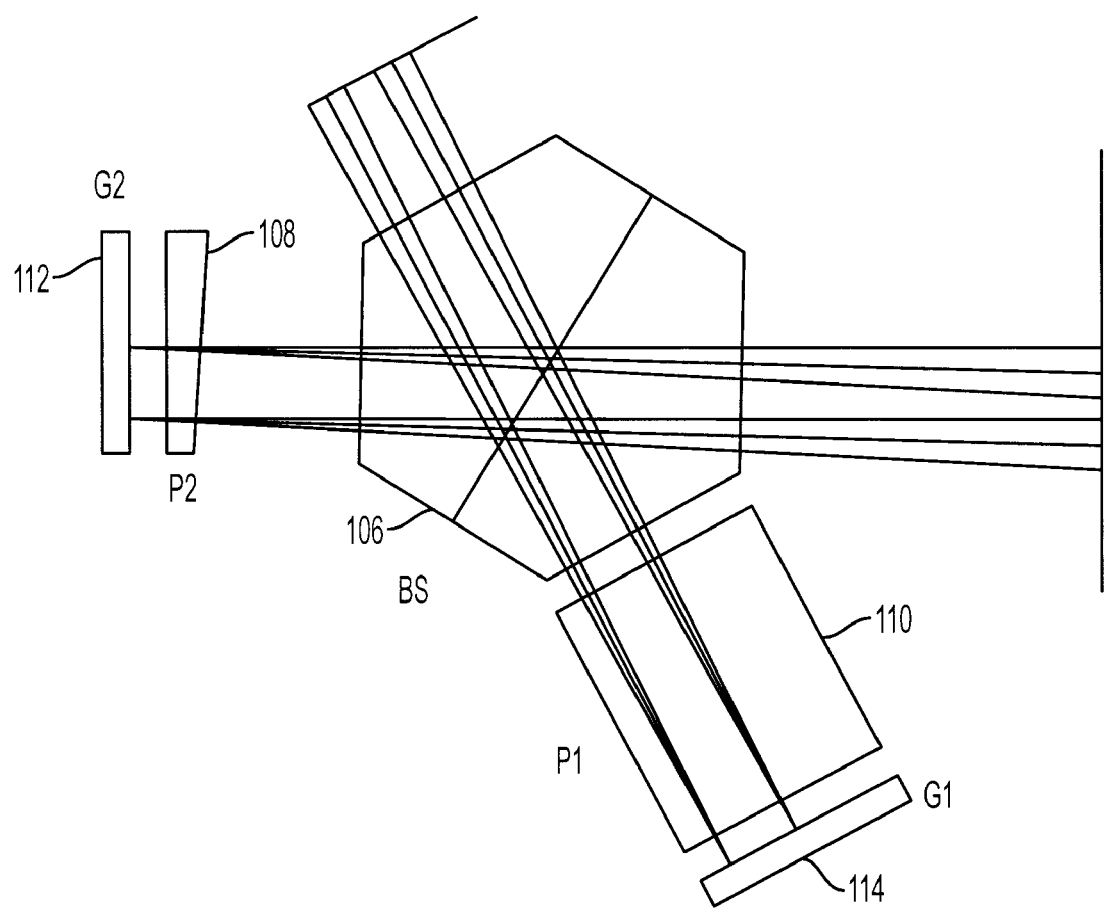
FIG. 6 is a schematic diagram of a field-widened DASH interferometer according to the invention.

Field-Widened DASH:

The maximum field of view that can be accepted by any interferometer, and therefore its sensitivity for diffuse sources, is determined by how the interferometric path difference varies with off-axis angle. To minimize this variation and achieve a maximum possible field of view SHS instruments can be field-widened by placing fixed prisms in each arm of the interferometer. The field of view for a field widened SHS depends on the prism angle and is generally larger for smaller prism angles. The maximum solid angle that can be accepted by a field widened SHS is typically two orders of magnitude larger than interferometers without field widening. The resulting increase in sensitivity is critical for high spectral resolution geophysical measurements where signals can be weak and/or are obscured by large background signals. Field widening techniques have also been used with stepped FTS, however, in this case plane-parallel blocks of glass are used instead of prisms. FIG. 6 is a schematic diagram of a field-widened DASH interferometer (BS: Beamsplitter, G1/2: Gratings, P1/2: Field widening prisms) designed, as an example, to measure four atmospheric $O_2\Delta$ lines in the near infrared (NIR) at wavelengths around 1.250 µm. The prism and grating angles in the two arms are the same, however, the prism in the lower right-hand portion of the figure is thicker to compensate the larger optical path in this arm. As indicated earlier, this system can be considered as a symmetric field-widened SHS with an offset aperture. Field widening is obtained by placing fixed prisms in each interferometer arm. The thicker prism (P1) in the lower right arm is required to compensate the larger path difference. The grating and prism angles are the same in each arm.

Table 1 indicates key specifications and the optical performance of this interferometer as determined by ray tracing. Note in particular that the field widening prisms enable the system to view a solid angle that is approximately 450 times larger than a non-field-widened system of the same resolution.

TABLE 1

| | |
|---|---|
| Path difference offset Δd | 6.5 cm |
| Path difference interval sampled | ±0.39 cm |
| Grating angle | 5.6 degrees |
| Resolving power at maximum path | 110,000 |
| Solid angle gain due to field widening | 450× |
| Littrow wavelength | 1.266 µm |

Table 2 lists four targeted $O_2\Delta$ lines near $\lambda$=1.250 µm along with the number of fringes each lines produces across the full aperture of the DASH interferometer. The last column indicates the number of fringes a non-heterodyned Michelson interferometer would need to record over the same path difference interval. The smaller number of fringes for the SHS and DASH enables sampling of the interferogram with a practical detector having hundreds of pixels. In order to simultaneously measure these four lines with a stepped Michelson interferometer a prefilter must be used to spatially separate each line on a different portion of the detector which adds complexity and reduces the sensitivity of the measurement.

TABLE 2

| | Number of fringes for +/−0.39 cm path interval | |
|---|---|---|
| Wavelength [µm] | Heterodyned (DASH, SHS) | Not Heterodyned (e.g. FTS) |
| 1.252644 | 65.7 | 9770.6 |
| 1.254210 | 57.9 | 9782.8 |
| 1.255809 | 50.0 | 9795.3 |
| 1.257439 | 41.9 | 9808.0 |

Phase Stability:

Michelson-based instruments, including ones that use the DASH concept, depend on measuring the absolute phase of the fringe pattern to determine the Doppler wind velocity. As a result one of the most challenging aspects of these measurements is the calibration and tracking of instrument drifts that affect the phase measurement. The drifts can be minimized by appropriate thermal compensation within the interferometer. In addition, active thermal control is possible as well as periodic measurements of a calibration source to determine the zero wind reference. All of these techniques have been implemented previously (e.g. on the WINDII instrument) and can be readily adapted to DASH. Since DASH can measure many lines simultaneously, the calibration source can be observed during an exposure which eliminates difficulties associated with alternating exposures between science and calibration images.

Test Apparatus:

A non-field-widened breadboard DASH interferometer was built and used to measure the Doppler shift of a laboratory line source for a typical upper atmospheric wind speed. The line source and the passband of the instrument were chosen to be in the near-IR (~1.5 μm) since there are atmospheric emission lines close to this wavelength region that are suitable for wind measurements on earth and other planets. The DASH breadboard was constructed using predominantly commercial off-the-shelf (COTS) components.

Figure 7:
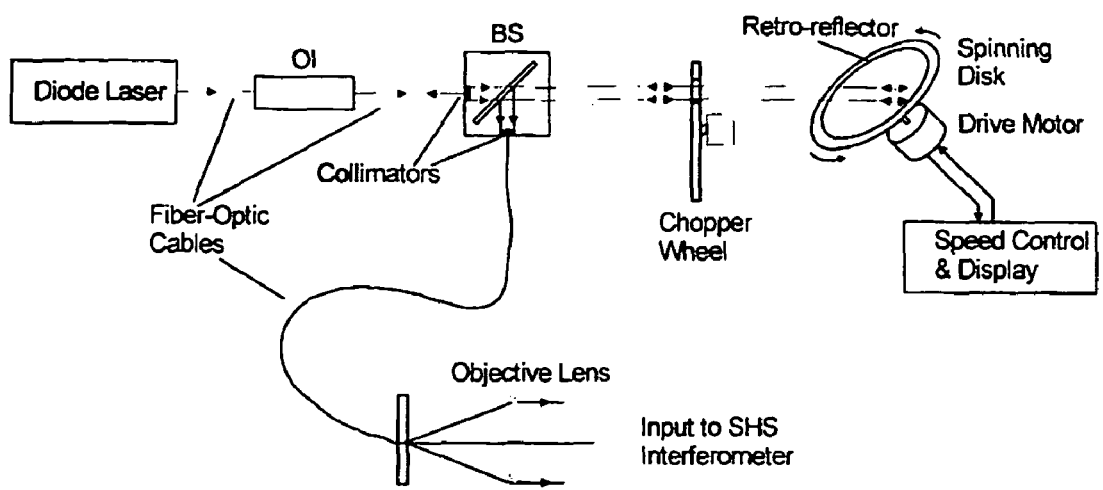
FIG. 7 is a schematic diagram of a laboratory light source set-up to produce an alternating shifted/non-shifted line signal to test a DASH laboratory interferometer similar to the one shown in FIG. 4.

A schematic of the laboratory line source set-up that produces an alternating Doppler shifted/non-Doppler shifted signal for a laboratory DASH demonstration is shown in FIG. 7. The complete laboratory set-up consists of two major parts, the line source and the spectrometer. A diode laser beam that is reflected from a spinning wheel provides a collimated source which can be alternated between Doppler shifted and non-Doppler shifted using a chopper wheel. The spectrometer includes the DASH interferometer, exit optics, and an array detector. The principle components of the breadboard set-up are described in Table 3.

TABLE 3

| Component | Parameter | Description |
|---|---|---|
| Line Source | | |
| Laser Diode | Manufacturer (Model) | Furukawa (FOL15DCWD-A81) |
| | Nominal Wavelength | 1528.78 nm |
| | Output Power | 40 mW |
| | Line Width | 1 MHz |
| | Operating Temperature | Nominal: 25° C. |
| Interferometer | | |
| Beamsplittter | Manufacturer (Model) | Thorlabs (BS015) |
| | R:T | 50:50 Nonpolarizing |
| | Flatness | 1/10 @ 635 nm |
| | Size | 25.4 mm³ (cube) |
| Gratings | Manufacturer | Newport Corporation |
| | Grooves Density | 300 mm$^{-1}$ |
| | Blaze Angle | 14.77° |
| | Blaze Wavelength | 1.71898 μm |
| | Coating | Gold |
| | Ruled Area | 26 mm × 26 mm |
| Detector | | |
| InGaAs Camera | Manufacturer (Model) | Xenics (XEVA-FPA-1.7-320) |
| | Pixel Pitch | 30 mm × 30 mm |
| | Wavelength Range | 0.9 μm-1.7 μm |
| | D* | 7.5 × 10$^{12}$ cm Hz$^{1/2}$/W |
| | Dynamic Range | 12 bit |

Referring now to FIG. 7, the signal from a 40 mW, single-mode, temperature controlled diode laser with $\lambda \approx 6630$ cm$^{-1}$, passes through an optical isolator to prevent back coupling into the laser cavity. After the isolator, the beam is collimated and sent through a beamsplitter to a chopper wheel. The chopper wheel is covered with retro-reflecting tape so that a non-Doppler shifted beam is reflected back to the beamsplitter when the chopper blade blocks the optical path to the spinning disk (or Doppler wheel). The Doppler wheel is an aluminum disk, also coated with retro-reflecting tape that is mounted at an angle to the optical axis. It rotates in order to produce a Doppler shift in the retro reflected beam. The beam returning from the Doppler wheel is subsequently reflected by the beamsplitter and coupled back into an optical fiber via a focusing lens. This fiber serves as the input to the interferometer.

The optical layout of the interferometer is shown in FIG. 4 where the path difference $\Delta d$ was set to 7.75 cm. The interferometer was vibrationally isolated from the optical bench and a top cover was used to suppress ambient and stray light contributions.

Figure 8:
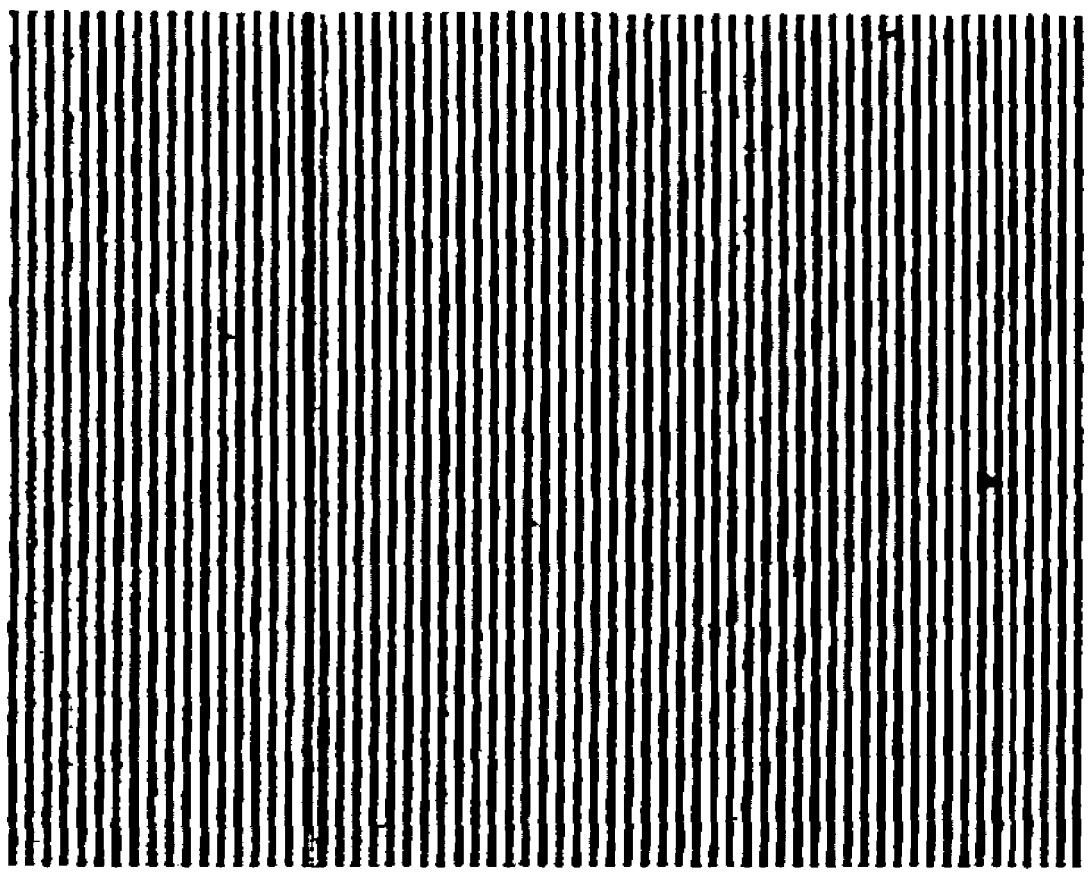
FIG. 8 is a typical dark and flat field corrected fringe image of a monochromatic source according to the invention.

Results:

Single line. FIG. 8 shows a typical fringe image or interferogram as obtained by the DASH breadboard instrument when viewing a monochromatic source. As expected from Eq. (4), the image shows a cosine fringe pattern with a single spatial frequency across the detector. The image has been dark corrected and flat field corrected.

Figure 9:
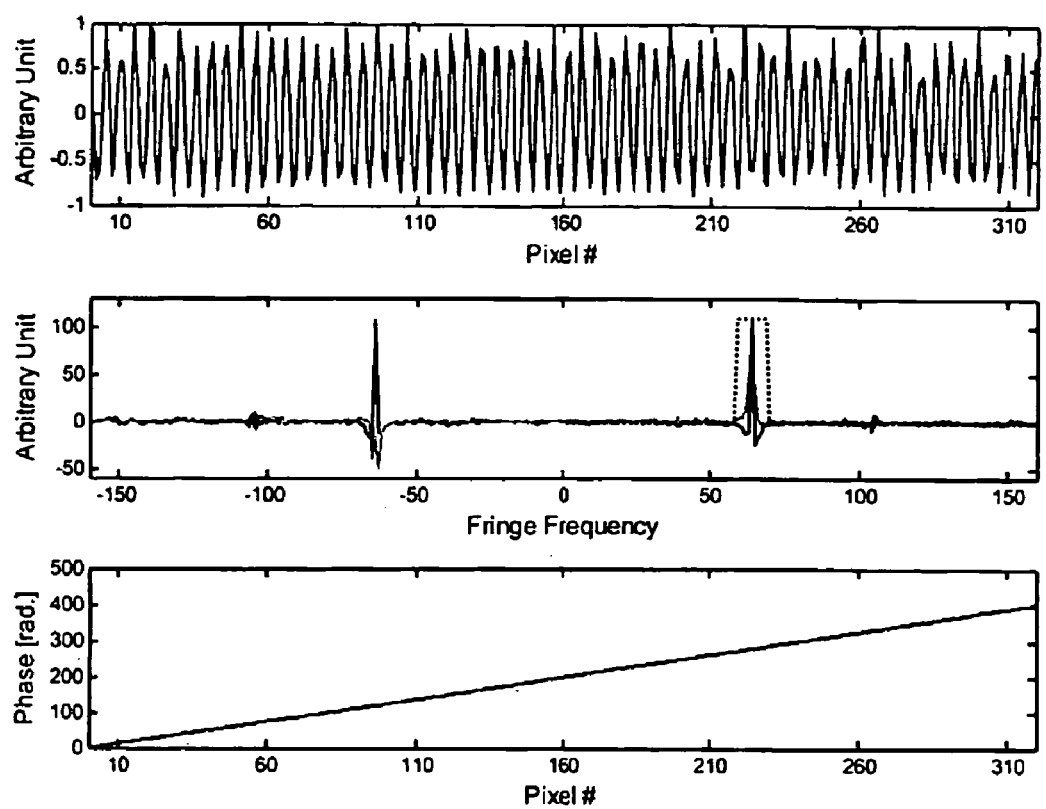
FIG. 9 shows an interferogram according to the invention in the top panel, the complex Fourier transform of the interferogram in the middle panel, where the dark line is the real part and the light line is the imaginary part, and the retrieved phase in the bottom panel.

The upper panel of FIG. 9 shows the intensity within a single row of a measured interferogram, specifically, one pixel row from a single dark, flat field, and offset corrected fringe image for a monochromatic source. The middle panel of FIG. 9 shows the real and imaginary part of the Fourier transform of this interferogram, where the real part is the darker line and the imaginary part is the lighter line. The salient features of this complex spectrum are the lines around $\pm \kappa_0 = \pm 64$ fringes per detector width. This is the fringe frequency produced by the wavelength of the laser diode. Following the procedure described above, the phase of the interferogram can be determined. A change in phase is a measure of a shift in line position and thus Doppler velocity. The isolation of the feature around $+\kappa_0$ is achieved by multiplying the complex spectrum with the boxcar function also shown in the middle panel of FIG. 9 with a dotted line. The resulting phase of the interferogram is shown in the bottom panel of FIG. 9. For a Doppler shifted line, the phase is expected to change according to Eq. (3). The phase shift of the fringe pattern along one detector row is a linear function of the optical path difference, and thus changes linearly across the recorded fringe pattern. Each pixel in the row provides a measure of a phase change due to the Doppler shift. A simple way to determine the phase shift between two fringe patterns is to compare the average phases across one single row. Subtracting these row averages yields the phase shift, $\delta\phi$, in the middle of the recorded fringe pattern (x=0), for which we defined the path offset $\Delta d$ (see FIG. 4).

Figure 10:
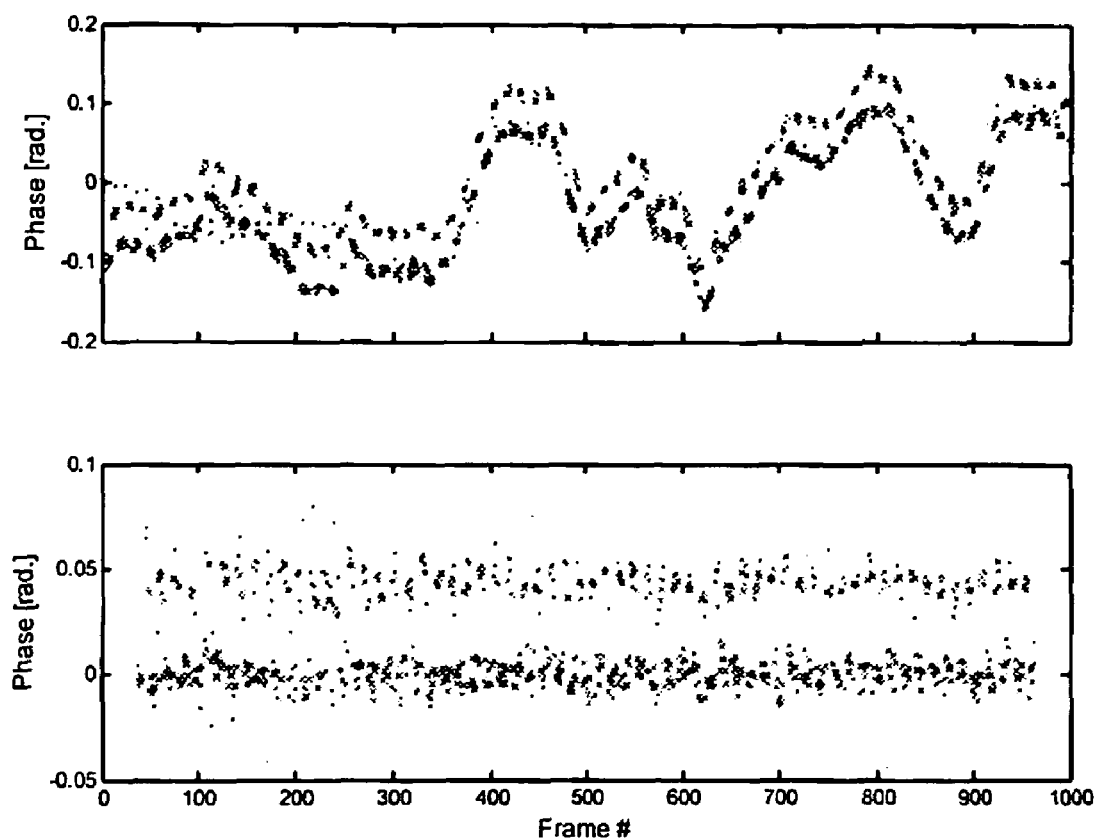
FIG. 10 shows the mean phase measurements obtained with a laboratory DASH setup and an alternating monochromatic source as shown in FIG. 7. The bottom panel shows the same data set after drift correction.

The top panel of FIG. 10 shows a time series of the average phase of a single interferogram row (the row-averaged phases for each frame in a series of measurements taken at 100 measurements per second), where the average phase of the first measurement was subtracted from all subsequent ones. One can clearly see the regularly occurring phase shifts in the series that are a result of the chopped signal (a periodic phase shift of about 0.05 rad), alternating the Doppler shifted signal and the reference, non-Doppler shifted signal. One can also see a drift which is slowly varying compared to the sample rate. This drift is likely due to the control loop of the thermal stabilization of the laser. To measure the phase shift caused by the Doppler effect, the mean phase of the Doppler shifted interferogram was subtracted from the mean phase of the non-Doppler shifted interferogram. The results for several measurement series are shown in Table 4 along with the Doppler speed, v, derived from the phase shift:

$$v = \frac{c\delta\varphi}{4\pi\Delta d\sigma} \quad (15)$$

TABLE 4

| Laser temperature [° C.] | Number of fringes | Phase shift [rad] | Speed calculated from phase shift [m/s] | Speed calculated from angular wheel velocity [m/s] |
| --- | --- | --- | --- | --- |
| 67 | 53 | 0.039(09) | 18.1 | 19.2 |
| 42 | 62 | 0.043(10) | 19.9 | |
| 30 | 66 | 0.044(12) | 20.4 | |
| 10 | 72 | 0.045(09) | 20.8 | |

The uncertainties quoted in Table 4 for the phase difference are the combined standard deviations of the two drift corrected measurement series as shown in the bottom panel of FIG. 10. They are a combination of the random noise in the interferogram propagated through the phase determination (see Eq. 14) and systematic contributions. For this breadboard we estimate that the primary contribution to the systematic uncertainty is due to the slow drift, which we attribute mainly to the frequency stabilization of the laser. Other contributors to the uncertainties are the thermal stability of the interferometer and the exit optics. Note that the stability of the source is not an issue for an atmospheric measurement. The thermal stability of a DASH interferometer and the exit optics can be tracked simultaneously with a known emission line source as described above.

For each measurement series in Table 4 the laser was thermally tuned to a slightly different wavelength so that the recorded fringe frequency was different. Also shown in Table 4 is the expected Doppler velocity, v, calculated from the angular velocity of the rotating retro-reflecting disc, $\omega$, the radial distance of the retro reflected spot from the disc center, r, and the angle of the disc with respect to the incident beam, $\theta$:

$$v = 2r\omega \cos(\theta) \quad (16)$$

The results agree within $<1.6$ ms$^{-1}$, and demonstrate the first Doppler velocity measurement using the DASH technique.

Figure 11:
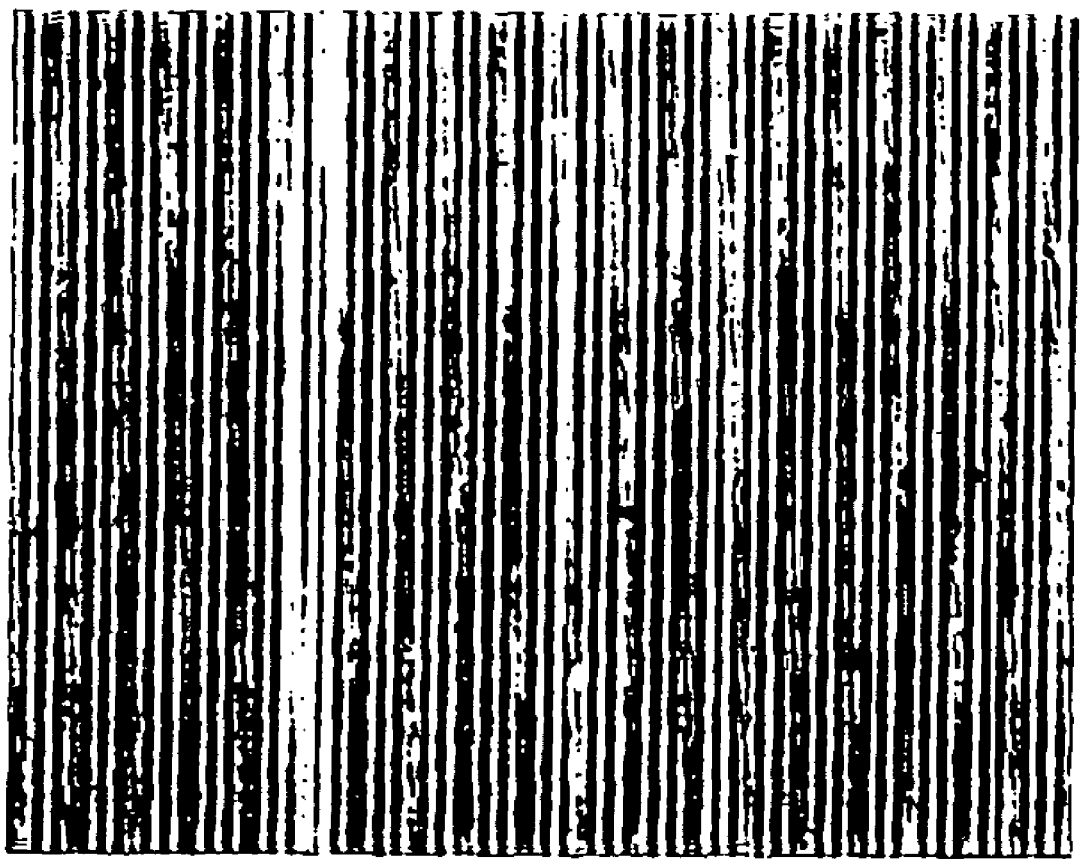
FIG. 11 is a flat fielded interferogram image with two lines in the passband according to the invention.

Multiple lines: An example of a flat fielded interferogram image with two lines (dark and flat field corrected fringe image) for two lines in the passband is shown in FIG. 11. Instead of a cosine fringe with a single spatial frequency the interferogram is a beat pattern resulting from two cosine fringes with different spatial frequencies. Since our DASH breadboard only has one laser source, this image was created by adding two interferogram images, each recorded for a different, thermally tuned, laser frequency. Interferograms for a two line source could have been recorded simultaneously; however, such a source was not available to us. Since the laboratory set-up only has one monochromatic but tunable source, this image was obtained by adding two monochromatic fringe patterns for different laser frequencies and thus different fringe frequencies.

Figure 12:
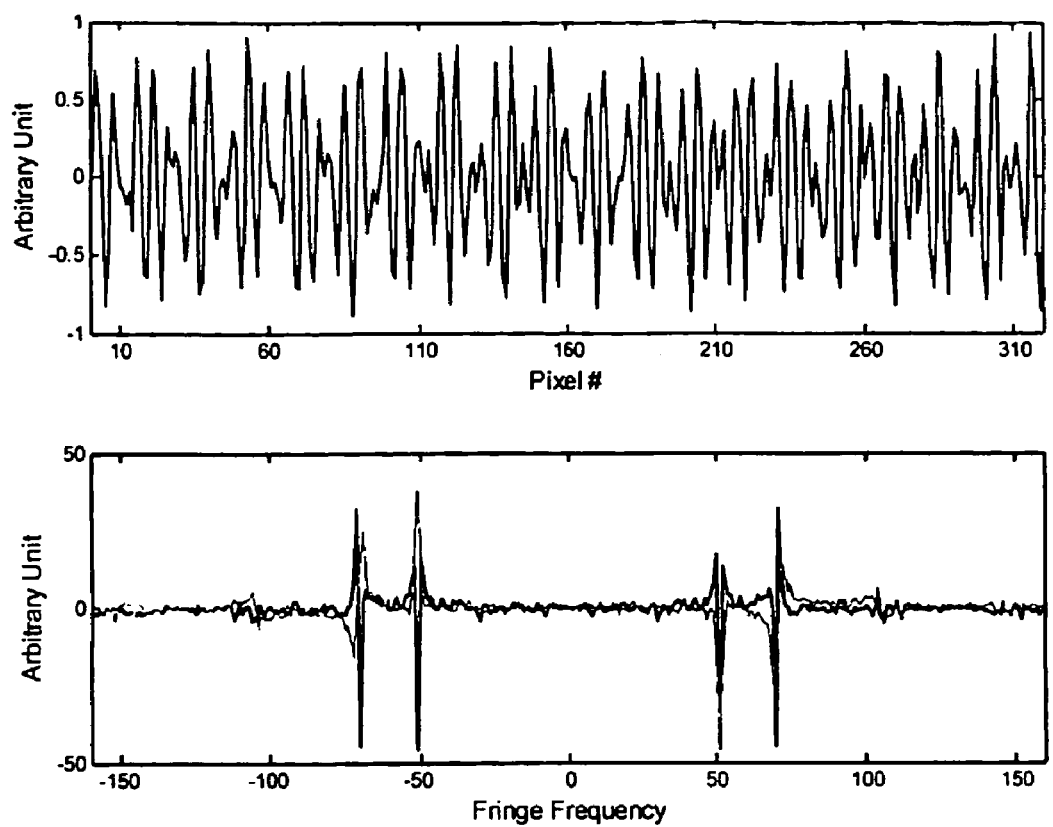
FIG. 12 shows an interferogram according to the invention in the top panel for a two line source and the complex Fourier transform of the interferogram in the bottom panel, where the dark line is the real part and the light line is the imaginary part.

FIG. 12 shows one row of the two line interferogram image in the upper panel and the complex spectrum in the bottom panel. Just as for the single line case, each one of the lines can be isolated (e.g. with a box car function centered on the spectral feature). In case the instrumental line shape function contributions from the neighboring lines are considered to be a non-negligible contribution, one can consider apodizing the interferogram which helps to localize the spectral feature (i.e. suppress the line shape contributions in the wings of the line). The remaining data processing to determine the phase is identical to the single line case. This procedure can also be readily applied in the case of three or more lines in the passband as long as the spectral features are well separated so they can be isolated. A phase determination can be achieved for each line independently.

The invention accordingly includes a phase-stepped Michelson technique and Spatial Heterodyne Spectroscopy (SHS). Like the phase-stepped Michelson, the interferogram is sampled only at large optical path differences but the interferometer arms are terminated with fixed, tilted gratings, like in SHS. This design enables the measurement of not just four but hundreds of phase points of a heterodyned interferogram over a large path difference interval simultaneously without moving parts.

For the measurement of Doppler winds the instrument preferably employs a large enough offset in path difference to enable the wind measurement and a large enough path difference interval to separate the multiple spectral components, i.e. emission lines in the passband. DASH like SHS allows field widening without moving parts by choosing prisms of the appropriate wedge angle and thickness for each arm.

Just as for stepped FTS and Fabry Perot interferometers, thermal effects on the measured phase are expected to be significant. To mitigate these effects, the DASH interferometer can be designed using materials that provide maximum thermal compensation as has been successfully demonstrated for stepped FTS, such as is described in Thuillier G. and G. G. Shepherd, "Fully compensated Michelson interferometer of fixed path difference," Appl. Opt., 24, 1599, 1985, and Thuillier G. and M. Herse, "Thermally stable field compensated Michelson interferometer for measurements of temperature and wind in the planetary atmospheres," Appl. Opt., 30, 1210, 1991, both of which are incorporated herein by reference. In addition, the above mentioned simultaneous phase tracking may be used to quantify and ultimately correct the remaining thermal effects.

Figure 13:
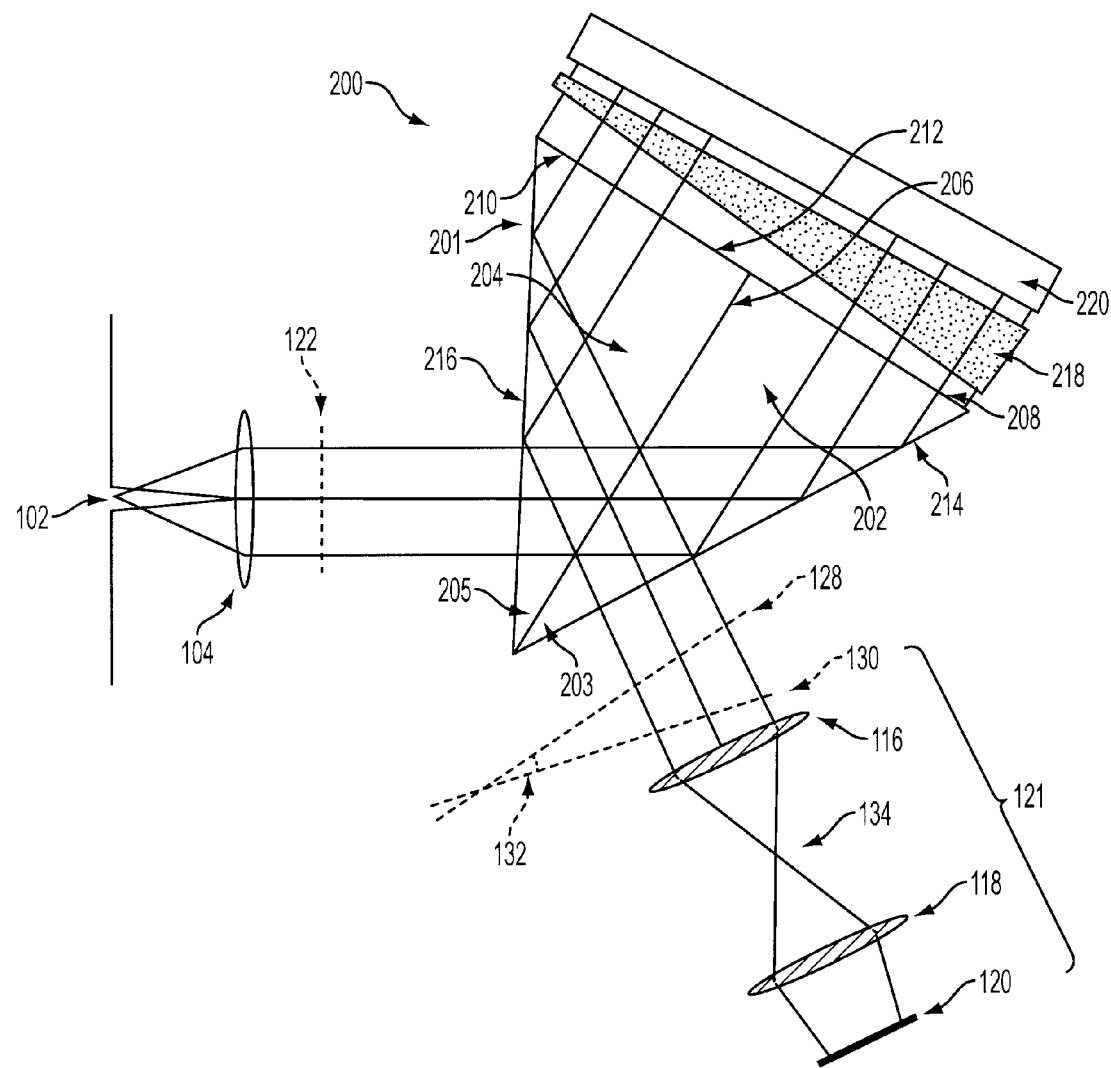
FIG. 13 a schematic diagram of a field-widened DASH system employing a Kösters prism according to the invention.

Referring now to FIG. 13, a parallel arm DASH spectrometer 200 is another embodiment employing the DASH concept, where the functionality provided by the beamsplitter 106 of the DASH spectrometer 100 along with making the chief rays entering the two interferometer arms parallel is provided by a Kösters prism 201, e.g. as described in U.S. Pat. No. 4,061,425, J. F. Wade, issued Dec. 6, 1977. Kösters prism 201 is a compound prism consisting of two identical 30-60-90 first and second prisms 202 and 204 joined at their longer legs/faces 203 and 205 to form a beamsplitting interface surface 206 (resulting from treating at least one of faces 203 and 205 with a suitable beamsplitter coating). The shorter legs 208 and 210 form a planar base 212 with the interface surface 206 terminating at its midline. A first prism hypotenuse surface is the light entrance face 216 while a second prism hypotenuse surface is the light exit face 214. Light accordingly enters the Kösters prism from the left through entrance face 216 and is divided into two beams by the beamsplitting surface 206. Subsequently, the two beams are made parallel by a total reflection on the prism faces 214 and 216. The beams then pass through an optional single field-widening prism 218 and are diffracted by a single grating 220. The diffracted beams are again reflected by the prism faces 214 and 216 and partially reflected and transmitted by the surface 206, so that the signal exiting the Kösters prism on the lower right is the superposition of half of the signal originating from each interferometer arm. The other half of the signal is exiting the Kösters prism on the entrance side 214, just as in a single port FTS, a conventional SHS, or DASH interferometer.

Like the DASH spectrometer 100, the parallel arm DASH spectrometer 200 can be temperature compensated. In particular, the effect of the grating groove expansion is compensated by the thermal change in the index of refraction of the field widening prism. If the interferometer expands around the bottom left point of the Kösters prism as shown in FIG. 13, i.e. if it is held there, the effect of the change in length of the interferometer arms due to a temperature change is zero.

Spectrometer 200 requires only one field widening prism and one grating instead of two each for spectrometer 100, providing labor/cost savings. The Kösters prism 201 is available off the shelf, which significantly reduces the cost of this component compared to a custom fabrication of the corresponding components of spectrometer 100. If spacers are used to assemble the interferometer, only two instead of four spacers are used (again, labor/cost savings). The equality of the fieldwidening prism angle, fieldwidening prism rotation, fieldwidening prism tilt, grating angle, grating rotation, grating tilt, and grating tilt in each arm is achieved by using the same prism and grating for both arms. This simplifies the alignment (again, labor/cost savings) when compared to where the elements in the two arms are independent. There is improved thermal stability of the interferometer, due to the proximity of the two arms and their close contact, which reduces thermal gradients, and since the effect of the thermal expansion on the length of the interferometer arms is eliminated when the interferometer is held on the line where two Kösters prism faces intersect with the beamsplitting surface. Thus, spectrometer 200 has a reduced cost with improved performance compared to spectrometer 100.

While the present invention has been described in terms of a preferred embodiment, it is apparent that skilled artisans could make many alterations and modifications to such embodiments without departing from the teachings of the present invention. Accordingly, it is intended that all such alterations and modifications be included within the scope and spirit of the invention as defined in the following claims.

What is claimed as new and desired to be protected by Letters Patent of the United States is:

1. A Doppler Asymmetric Spatial Heterodyne (DASH) spectrometer, comprising:
    an input aperture (A) for receiving an input light;
    a collimating lens for collimating the input light into a collimated light;
    a beamsplitter for splitting the collimated light into a first optical path and into a second optical path, wherein the first optical path comprises a first grating positioned to reflect the first collimated light portion back to the beamsplitter as a first optical path light wavefront, and the second optical path comprises a second grating positioned to reflect the second collimated light portion back to the beamsplitter as a second optical path light wavefront, and wherein the second grating is positioned at a greater distance than the first grating with respect to the beamsplitter to produce an offset in a light wavefront path distance between the first and second optical path wavefronts;
    an output optics section comprising a detector; and
    whereby the beamsplitter recombines the first and second optical path light wavefronts having the path distance offset into an interference wavefront in the output optics section to form an interference image that includes a plurality of phase points of a heterodyned interferogram measured simultaneously over the path distance offset, and the detector receives the interference image and outputs an interference image pattern.

2. A DASH spectrometer as in claim 1, wherein the offset in path difference is sufficient to enable separation of multiple spectral components.

3. A DASH spectrometer as in claim 1, further comprising:
    a first field-widening prism positioned between the beamsplitter and the first grating in the first optical path; and
    a second field-widening prism positioned between the beamsplitter and the second grating in the second optical path.

4. A DASH spectrometer as in claim 3, wherein the input light is in the infrared part of the electromagnetic light spectrum and the spectrometer is configured to process the infrared input light.

5. A DASH spectrometer as in claim 3, wherein the input light is in the uv part of the electromagnetic light spectrum and the spectrometer is configured to process the uv input light.

6. A method for forming an interference image pattern corresponding to an interference image that includes a plurality of phase points of a heterodyned interferogram measured simultaneously over a light path distance offset, comprising:
    receiving an input light;
    collimating the input light into a collimated light;
    splitting the collimated light into a first optical path and into a second optical path, wherein the first optical path comprises a first grating positioned to reflect the first collimated light portion back to the beamsplitter as a first optical path light wavefront, and the second optical path comprises a second grating positioned to reflect the second collimated light portion back to the beamsplitter as a second optical path light wavefront, and wherein the second grating is positioned at a greater distance than the first grating with respect to the beamsplitter to produce an offset in a light wavefront path distance between the first and second optical path wavefronts;
    recombining the first and second optical path light wavefronts having the path distance offset into an interference wavefront in an output optics section to form an interference image; and
    receiving the interference image in a detector and outputting the corresponding interference image pattern.

7. A method as in claim 6, wherein the input light is in the infrared part of the electromagnetic light spectrum and the spectrometer is configured to process the infrared input light.

8. A method as in claim 6, wherein the input light is in the visible part of the electromagnetic light spectrum and the spectrometer is configured to process the visible input light.

9. A method as in claim 6, wherein the input light is in the uv part of the electromagnetic light spectrum and the spectrometer is configured to process the uv input light.

10. A Doppler Asymmetric Spatial Heterodyne (DASH) spectrometer, comprising:
    an input aperture for receiving an input light a collimating lens for collimating the input light into a collimated light; offset establishing means, including at least one grating, for
    i) receiving and splitting the collimated light into a first light wavefront in a first optical path and into a second light wavefront in a second optical path,
    ii) establishing an offset in a light wavefront path distance between the first and second optical path light wavefronts, and
    iii) diffracting and recombining the first and second optical path light wavefronts into an interference wavefront to form an interference image that includes a plurality of phase points of a heterodyned interferogram measured simultaneously over the path distance offset; and an output optics section comprising a detector for receiving the interference image and outputting an interference image pattern.

11. A DASH spectrometer as in claim 10, wherein the offset establishing means comprises:

a beamsplitter for splitting the collimated light into the first optical path as the first collimated light portion and into the second optical path as the second collimated light portion;

a first grating positioned in the first optical path for reflecting the first collimated light portion back to the beamsplitter as the first optical path light wavefront; and a second grating positioned in the second optical path for reflecting the second collimated light portion back to the beamsplitter as the second optical path light wavefront, and wherein the second grating is positioned at a greater distance than the first grating with respect to the beamsplitter to produce the offset in the light wavefront path distance between the first and second optical path wavefronts.

12. A DASH spectrometer as in claim 11, wherein the input light is in the infrared part of the electromagnetic light spectrum and the spectrometer is configured to process the infrared input light.

13. A DASH spectrometer as in claim 11, wherein the input light is in the visible part of the electromagnetic light spectrum and the spectrometer is configured to process the visible input light.

14. A DASH spectrometer as in claim 11, wherein the input light is in the uv part of the electromagnetic light spectrum and the spectrometer is configured to process the uv input light.

15. A DASH spectrometer as in claim 10, wherein the offset establishing means comprises i) a Kösters prism and wherein said at least one grating is a single grating; and ii) a field-widening prism positioned between the Kösters prism and the single grating.

16. A DASH spectrometer as in claim 15, wherein the input light is in the infrared part of the electromagnetic light spectrum and the spectrometer is configured to process the infrared input light.

17. A DASH spectrometer as in claim 15, wherein the input light is in the visible part of the electromagnetic light spectrum and the spectrometer is configured to process the visible input light.

18. A DASH spectrometer as in claim 15, wherein the input light is in the uv part of the electromagnetic light spectrum and the spectrometer is configured to process the uv input light.

19. A Doppler Asymmetric Spatial Heterodyne (DASH) spectrometer, comprising:

an input aperture for receiving an input light a collimating lens for collimating the input light into a collimated light;

a Kösters prism for receiving and splitting the collimated light into a first light wavefront in a first optical path and into a second light wavefront in a second optical path while establishing an offset in a light wavefront path distance between the first and second optical path light wavefronts;

a grating for diffracting and recombining the first and second optical path light wavefronts into an interference wavefront to form an interference image that includes a plurality of phase points of a heterodyned interferogram measured simultaneously over the path distance offset; and an output optics section comprising a detector for receiving the interference image and outputting an interference image pattern.

20. A DASH spectrometer as in claim 19, further comprising a field-widening prism positioned in the first and second optical paths between the Kösters prism and the grating.

21. A DASH spectrometer as in claim 20, wherein the input light is in the infrared part of the electromagnetic light spectrum and the spectrometer is configured to process the infrared input light.

22. A DASH spectrometer as in claim 20, wherein the input light is in the visible part of the electromagnetic light spectrum and the spectrometer is configured to process the visible input light.

23. A DASH spectrometer as in claim 20, wherein the input light is in the uv part of the electromagnetic light spectrum and the spectrometer is configured to process the uv input light.

* * * * *